United States Patent
Lambert

(10) Patent No.: US 9,119,020 B2
(45) Date of Patent: Aug. 25, 2015

(54) METHOD AND APPARATUS FOR DISCOVERING WIRELESS DEVICES

(71) Applicant: Marvell World Trade Ltd., St. Michael (BB)

(72) Inventor: Paul A. Lambert, Mountain View, CA (US)

(73) Assignee: MARVELL WORLD TRADE LTD., St. Michael (BB)

(*) Notice: Subject to any disclaimer, the term of this patent is extended or adjusted under 35 U.S.C. 154(b) by 37 days.

(21) Appl. No.: 13/761,540

(22) Filed: Feb. 7, 2013

(65) Prior Publication Data

US 2013/0203413 A1 Aug. 8, 2013

Related U.S. Application Data

(60) Provisional application No. 61/596,377, filed on Feb. 8, 2012.

(51) Int. Cl.

| | |
|---|---|
| *H04W 4/00* | (2009.01) |
| *H04W 8/00* | (2009.01) |
| *H04W 4/20* | (2009.01) |
| *H04L 29/08* | (2006.01) |
| *H04M 3/42* | (2006.01) |
| *H04B 7/00* | (2006.01) |

(52) U.S. Cl.
CPC ............. *H04W 8/005* (2013.01); *H04L 67/16* (2013.01); *H04W 4/20* (2013.01); *H04L 67/04* (2013.01); *H04W 4/008* (2013.01)

(58) Field of Classification Search
USPC ........................................................ 455/435.1
See application file for complete search history.

(56) References Cited

U.S. PATENT DOCUMENTS

| | | | |
|---|---|---|---|
| 7,085,814 B1* | 8/2006 | Gandhi et al. ................ 709/208 |
| 8,890,661 B2* | 11/2014 | Saros et al. ................... 340/10.5 |
| 2007/0141986 A1* | 6/2007 | Kuehnel et al. ............. 455/41.2 |
| 2007/0286380 A1* | 12/2007 | Hong et al. ............. 379/201.01 |
| 2009/0029728 A1* | 1/2009 | Shen et al. .................... 455/507 |
| 2009/0239469 A1* | 9/2009 | Rangarajan et al. ......... 455/41.2 |
| 2010/0015953 A1* | 1/2010 | Lucas et al. ................ 455/412.1 |
| 2010/0235525 A1* | 9/2010 | McGuire et al. ............. 709/228 |
| 2010/0304759 A1* | 12/2010 | Leppanen et al. ......... 455/456.2 |
| 2011/0149806 A1* | 6/2011 | Verma et al. ................... 370/255 |
| 2011/0165864 A1* | 7/2011 | Guzman ................... 455/414.1 |
| 2012/0022948 A1* | 1/2012 | Jones et al. ................ 705/14.64 |
| 2012/0131186 A1* | 5/2012 | Klos et al. .................... 709/224 |

FOREIGN PATENT DOCUMENTS

WO WO 2007/136622 A2 * 5/2007

* cited by examiner

*Primary Examiner* — Timothy Pham

(57) ABSTRACT

Wireless discovery is the process in which a service or application is located by a wireless station on a network, usually after the station has established a connection with the network. Wireless pre-association refers to the process of describing an application or service by its hardware/software interoperability requirements and/or a unique identifier prior to a connection being established between two or more wireless stations. A method performs wireless discovery between two or more wireless stations by communicating a data string between a wireless station and another wireless station, prior to a connection having been established between the wireless station and another wireless station, the data string including interoperability information necessary for a service or an application to run on a wireless station receiving the data string.

19 Claims, 8 Drawing Sheets

UNIQUE HEIRARCHICAL
IDENTIFICATION
(CENTRALIZED)

UNIQUE ADDRESS SPACE
IDENTIFICATION
(DE-CENTRALIZED)

METHOD AND APPARATUS FOR DISCOVERING WIRELESS DEVICES

CROSS REFERENCE TO RELATED APPLICATION

This claims the benefit of U.S. Provisional Application Ser. No. 61/596,377, filed on Feb. 8, 2012, the disclosure of which is incorporated herein by reference in its entirety.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Wireless discovery refers to the process by which Wi-Fi connected mobile devices such as cell phones, laptops, tablets and the like (also known as "stations") seek out other wireless stations carrying some useful service or application. An example may be a smartphone seeking a router offering internet connection capability, a laptop seeking a Wi-Fi enabled color printer (or print server), or a tablet seeking other stations running a particular social media application. In the case of the latter, it may also be advantageous to not only find other devices running the application, but to categorize each device by group, for example, according to commonly shared social media peers.

The current wireless discovery infrastructure is highly inefficient, relying on individual stations establishing station-to-station connections prior to the service/application discovery process, often based on little more than a service set identifier (SSID). Only after the connections have been negotiated can the individual stations perform application-level service discovery, which may consist of exchanging lengthy message strings (e.g., via UPnP or Bonjour), which determine the basic inter-operability requirements for a given service or application. An analogy to this process could be making a reservation at a restaurant, waiting to be seated, and ordering a drink before finding out which items are listed on the menu.

SUMMARY

Aspects of this disclosure are concerned with alleviating inefficiency in the wireless discovery process by transmitting compressed (application or service) data strings prior to a connection being established between stations. This is referred to herein as station "pre-association." The strings set forth the particular service or application supported by the transmitting device, as well as any and all inter-operability requirements necessitated by a requesting device. As a consequence, connections may be established only when necessitated, supported, and useful. Further, ancillary services requisite to a given full service or application (e.g., the "print spool" service for printing) in a given device may be initialized following the pre-association stage, in anticipation of the connection under negotiation.

Aspects of this disclosure relate to an efficient wireless discovery process. The methods and systems described herein potentially provide significant improvements in the prevention of congestion and in power efficiency for an environment consisting of many mobile devices. In this scenario, the devices will typically have no prior association or common configuration. In some embodiments, it is assumed that the devices can determine time and initiate synchronous behaviors.

In one embodiment, a method for performing wireless discovery between two or more wireless stations is disclosed. The method includes communicating a data string between a first wireless station and a second wireless station, prior to a connection having been established between the first wireless station and the second wireless station, the data string including interoperability information necessary (desired) for a service or an application to run on a wireless station receiving the data string. In an embodiment, the method further includes establishing a wireless connection between the first wireless station and the second wireless station if the wireless station receiving the data string contains the necessary interoperability hardware and/or software to run the service or application described by the data string.

Various embodiments relating to this method include the data string further including a unique identification for the service or application. In one embodiment, the data string is an output of a hashed function based on the service or application identification data. In another embodiment, the data string is an unused or invented parameter of a layer 3 or lower protocol of the OSI 7-layer model. In still another embodiment, the data string further includes supplementary information about the service or application not essential to identifying and running the service or application by the wireless station receiving the data string. In an embodiment, the supplementary information contains data specifying one or more groups to which the transmitting station belongs.

Other aspects of the disclosure relate to a wireless station having electronics and/or software configured to generate a data string including interoperability information necessary (desired) for a service or an application stored on the wireless station to run on a second wireless station receiving the data string, and a wireless transceiver configured to transmit the data string to the second wireless station prior to a connection having been established between the wireless station and the second wireless station. In one embodiment, a wireless connection between the wireless station and the second wireless station is only established if the second wireless station contains the necessary interoperability hardware and/or software to run the service or application described by the data string. In another embodiment, the data string further includes a unique identification for the service or application. In an embodiment, the data string is an output of a hashed function based on the service or application identification data. In another embodiment, the data string is an unused or invented parameter of a layer 3 or lower protocol of the OSI 7-layer model. In another embodiment, the data string may further include supplementary information about the service or application not essential to identifying and running the service or application by the wireless station receiving the data string. In an embodiment, the supplementary information contains data specifying one or more groups to which the transmitting station belongs.

Another embodiment of the disclosure relates to a computer readable storage medium storing instructions for causing one or more processors to perform the step of transmitting a data string from a first wireless station to a second wireless station, prior to a connection having been established between the first wireless station and the second wireless station, the data string comprising interoperability information necessary (desired) for a service or an application to run on the second wireless station. According to this aspect, a further step may include establishing a wireless connection between the first wireless station and the second wireless station if the wireless station receiving the data string contains the necessary interoperability hardware and/or software to run the service or application described by the data string.

Some embodiments may involve the data string further including a unique identification for the service or application. In an embodiment, the data string is an output of a hashed function based on the service or application identification data, and may be an unused or invented parameter of a layer 3 or lower protocol of the OSI 7-layer model. In another embodiment, the data string further includes supplementary information about the service or application not essential to identifying and running the service or application by the wireless station receiving the data string, and may also involve the supplementary information containing data specifying one or more groups to which the transmitting station belongs.

BRIEF DESCRIPTION OF THE DRAWINGS

Various embodiments of this disclosure that are provided as examples will be described in detail with reference to the following figures, in which like numerals reference like elements, and wherein.

DETAILED DESCRIPTION

Figure 1:
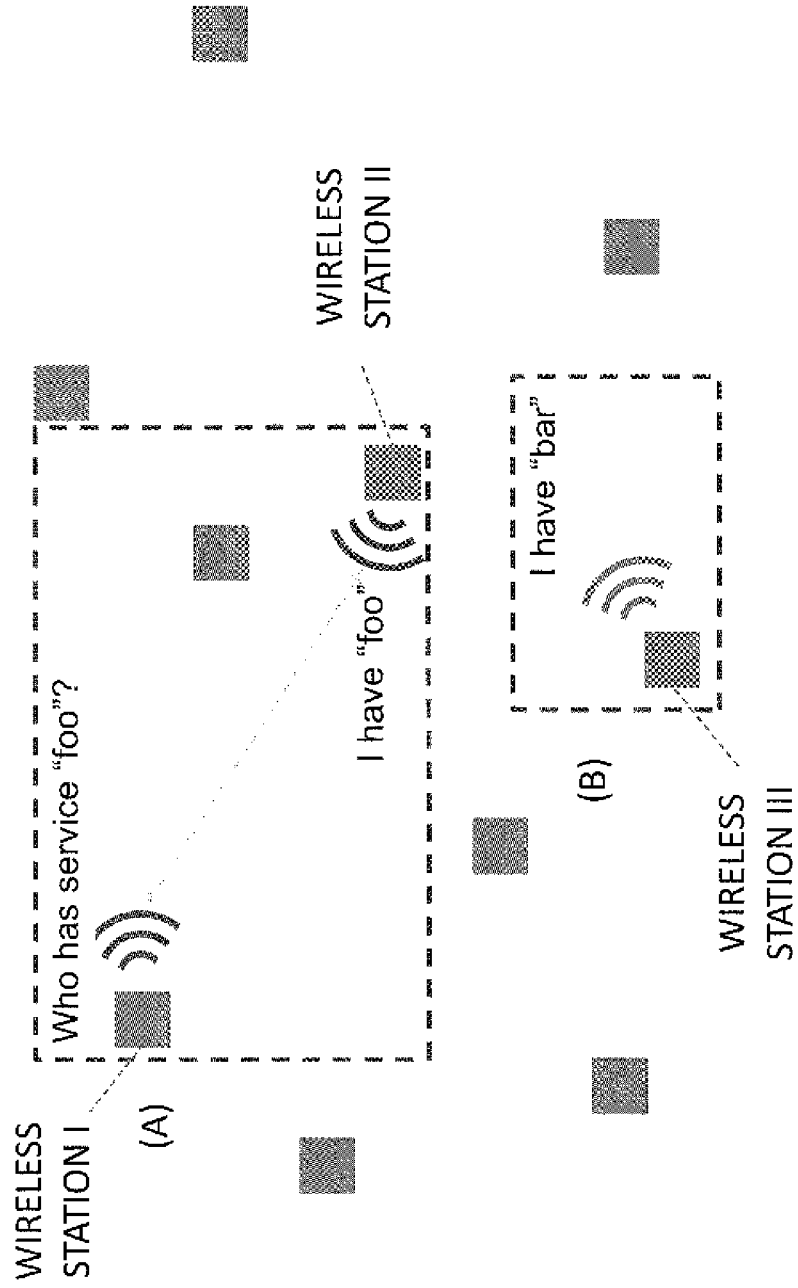
FIG. 1 illustrates the alternate service discovery framework options: probe/response or unsolicited beacon broadcast.

The disclosure is described in detail with reference to the following drawings and description. The components in the figures are not necessarily to scale, emphasis instead being placed upon illustrating principles of the invention. Moreover, in the figures, like reference numerals designate corresponding similar parts or elements throughout the different views.

For the purpose of this disclosure, all wireless elements are referred to as wireless "stations." This may include wireless elements normally referred to as "stations" (such as cell phones and tablets), but may also include other wireless elements often referred to as "access points" such as routers and print servers.

Wireless discovery may describe the process in which wireless stations, such as smart phones or laptops, locate neighboring stations supporting services or applications of interest via Wi-Fi or any other wireless protocol. Wireless discovery most generally refers to any two (or more) stations establishing a wireless network together. In its most basic configuration, this could simply be a single station (e.g., a laptop) discovering and connecting to a wireless printer. However, wireless discovery more frequently refers to the process of individual stations (e.g., smart phones, tablets, etc.) discovering a common station (e.g., a router) supporting multiple network connections (e.g., many other smart phones) and offering an internet gateway service. Such a configuration is generally known as a "hot spot."

FIG. 1 illustrates two possible configurations for the wireless discovery process. As illustrated in FIG. 1, the identification of services or applications in neighboring stations may be performed by (A) a probe request/response model, in which a station seeking a service or application actively probes its environment in search of a peer, or may alternatively (B) be "advertised" in a beacon unicast or multicast message originating from the supporting peer station. In a common configuration, the "hot spot" configuration described above, the advertised service is simply an internet gateway service allowing a requesting/subscribing station to access the internet. Of particular importance in FIG. 1 are the messages "who has service foo?," "I have foo," and "I have bar." These messages may be referred to as pre-association messages, because they occur before connections between the respective stations have been negotiated and established. Aspects of the disclosure are related to the exchange of more meaningful and diverse messages during the pre-association stage than are exchanged according to the current and legacy frameworks.

As described above, wireless discovery is usually performed in conjunction with a desired service or application. Wireless services and applications, although related, have different common definitions. In general, wireless services are usually associated with some form of tangible functionality, such as performing a certain task. For example, the router in the above example may offer a gateway service, which allows internet access to subscribing wireless stations. Alternatively, a print server may perform a printing function for subscribed stations.

In contrast to wireless services, a wireless station may be instead interested in locating a commonly run application on a neighboring wireless station. Some examples of shared wireless applications could include participation in one or more social networking applications, or gaming applications requiring two or more active participants (e.g., playing chess or poker against local, human opponents).

Regardless of whether a station is seeking a particular wireless service or application, the service or application must first be "discovered" by the requesting station as illustrated in FIG. 1. According to the legacy infrastructure, the wireless discovery process occurs post-connection. That is, a station may first enter a "hot spot" network area identified only by the network's service set identifier (SSID), to which the station requests a connection. Despite its name, the SSID rarely refers to the services that a network supports or offers, and usually is just a distinguishing name, e.g., "Jane's Coffee Shop." The wireless connection negotiation begins, with messages exchanged between the stations (usually a smart phone, tablet or laptop and a router), and the connection is established.

Once the connection has been established, high-level protocols such as the universal plug and play (UPnP) or Bonjour protocols may be used to define post-association service or application discovery parameters. That is, the process of discovering specific applications and/or services available through the network is done after this connection has been established, and the post-connection discovery process is mediated by higher level applications (such as UPnP and Bonjour), which generally communicate by exchanging (relatively) lengthy data strings (especially in the case of UPnP). The post-connection discovery process may also require choosing one application layer protocol over another (e.g., Bonjour and UPnP do not usually work together).

Figure 2:
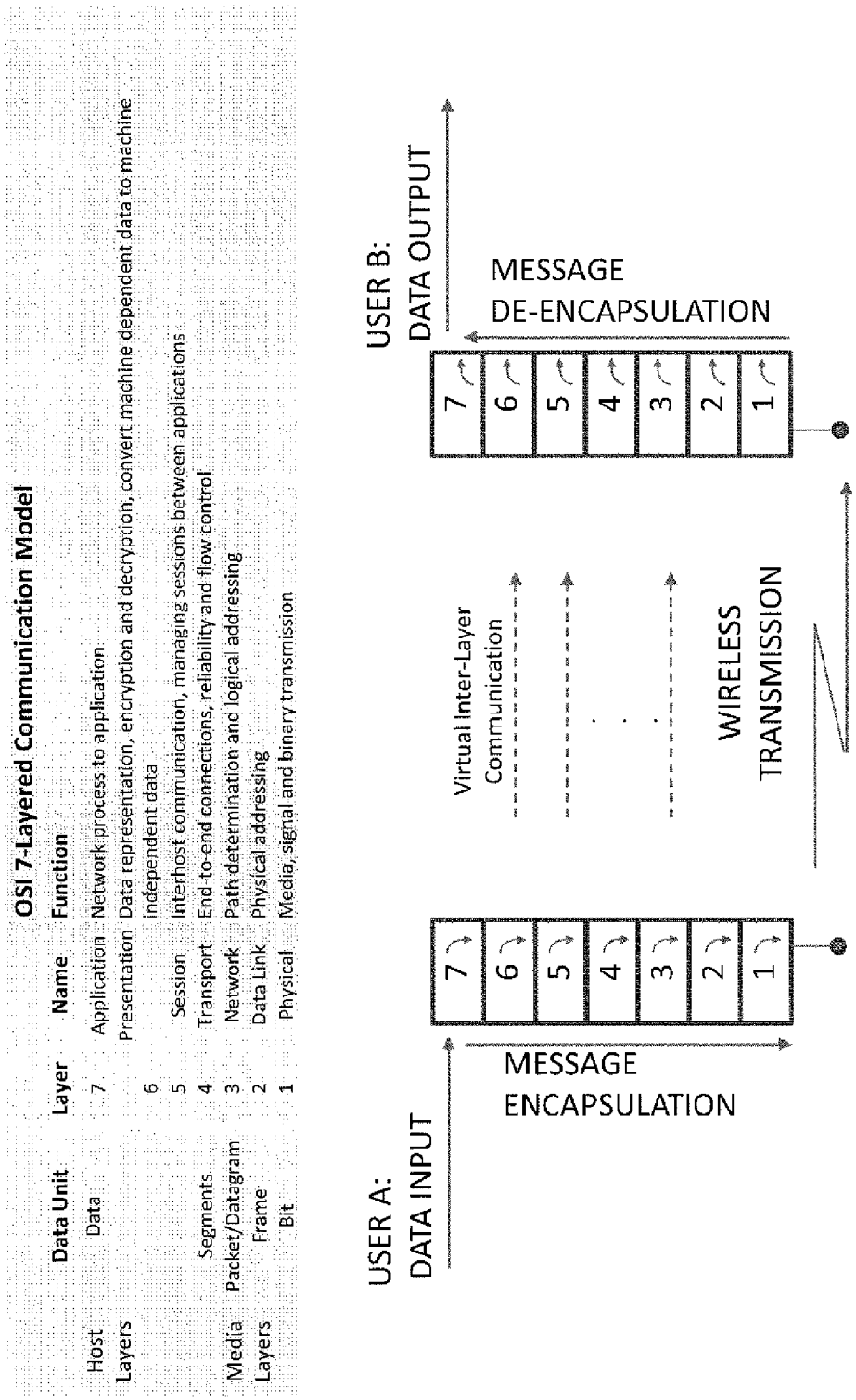
FIG. 2 illustrates the OSI 7-layer model and its implementation in a typical data transmission example.

FIG. 2 defines the various layers of the 7-layered OSI communication model and illustrates the path that a generic message might take. Layer 7 refers to the application layer, which is the layer a user might interact with. Descending the protocol "stack," a typical message would become appended with consecutive protocol tags, transformed into segments, packets, frames and finally bits prior to transmission from the physical layer (layer 1), possibly via wireless antenna. The reverse process occurs on the receiving side.

The OSI "model" is not physically present in some circuit element, but rather defines the full list of processes (encapsulation or de-encapsulation) that a given message or data structure (e.g., text message with an embedded jpeg image or mp3 audio clip) experiences in going from a user-friendly, user-accessible, application specific format (layer 7) to the raw bits (0's and 1's) transmitted between the physical interfaces (layer 1) of communication stations. For the purposes of this disclosure, communication is assumed to be via a wireless link, but in general may be any communication medium, e.g., a voice-over-IP (VoIP) telephone conversation carried by fiber optic cables between opposite ends of the globe.

Viewed from a slightly different perspective, and as illustrated by the dashed arrows in FIG. 2, the OSI model represents communication functions grouped into logical layers. In this lateral perspective, the various layers on the transmitting side can be thought of as being in essentially independent communication with their corresponding counterpart layers on the receiving side, resulting in a synchronized communication session. This is accomplished by appending protocol information to the messages during encapsulation. When the message is de-encapsulated, protocol information from, say, transmitting layer 4 is stripped from the message and used by receiving layer 4. This "piggybacking" of sub-layer messages offers a very useful and heretofore unexploited property of the OSI model: the ability to "smuggle" short message strings into lower layers of the OSI model on the backs of messages undergoing encapsulation/de-encapsulation. These strings may then be used at the receiving end to map low-level strings into useful high-level functionality. For example, the receipt of a short message string in layer 2, indicating mutual compatibility between stations regarding a certain service or application, may cause the receiving station to instantiate an application in layer 7 prior to and in anticipation of an impending connection with the compatible peer station.

In an embodiment of the present disclosure, the available services and/or applications available to a given wireless station may be communicated by relatively short data strings during station pre-association prior to a communication session having been negotiated between the stations. The data strings may represent an available service or application supported by or running on a station, and may also include any and all interoperability requirements associated with the service or application. The strings may be transmitted between the lower layers of the OSI model (say, between transmitting and receiving layer 2), where they may subsequently be mapped into higher level (for example, layer 7) functionality via a look-up table or similar logical map (e.g., hashing function). Thus, communicating stations may exchange extremely short strings that nonetheless uniquely characterize a much more complex, robust service and its associated protocol stack.

As previously described, the utility in this approach is that high level applications (e.g., layer 7) such as UPnP and Bonjour communicate by exchanging relatively lengthy strings. This is necessary for a formal communications link between stations. However, for service or application pre-association, in which a station needs only to have enough information to allow the station to make a "yes or no" decision, all that may be necessary is the identification of a given service or application and enough information for a given station to determine whether the station supports the service or application being advertised. This information may be provided based on a look-up table or other reference scenario (e.g., hashing function) at the receiving station, providing a certain amount of data compression.

By making "yes/no" (true/false) determinations in advance, stations may avoid requesting/accepting connections from other stations, saving time and energy for each station. Moreover, as further described below, connections may be obtained for increasingly select groups of stations (for example, only peers from a social media application may be accepted), resulting in an extremely selective but highly optimized network of stations.

Figure 3:
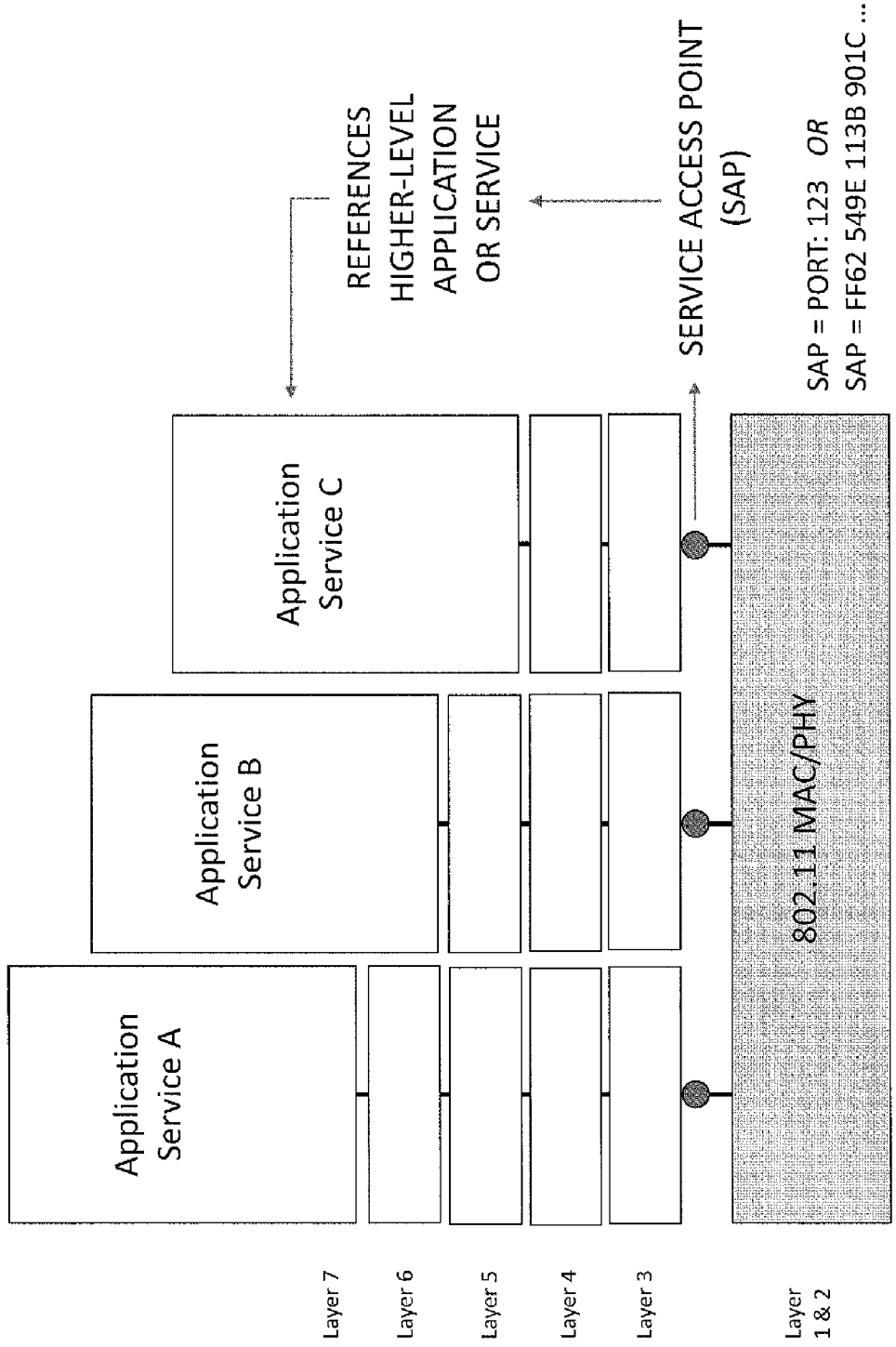
FIG. 3 illustrates two equivalent representations of a layer 2 service access point (SAP) referencing a higher layer application.

FIG. 3 illustrates a possible means of conveying this information from a station. In FIG. 3, a single "service access point" (SAP) is defined by an unused or invented protocol parameter (e.g., Port: 123) or a hexadecimal string (e.g., FF62 549E 113B 901C . . . ). Although a service access point (SAP) may also be referred to as a service identifier or "Service ID," SAP more suggestively indicates the collection of protocols and parameters involved in identifying a given service.

The SAP enumerates the ability of a given station to support a specific protocol stack. The protocol stack, in turn, defines the interoperability requirements that a requesting station must possess and/or instantiate in order to utilize the service or application (for example, Application Service C in FIG. 3). This model naturally lends itself to a variety of desirable system architecture standards, such as the "certified conformance" of or to certain special SAP's, or even the support of proprietary SAP's. Although FIG. 3 depicts the SAP as potentially being stored as a port number, the SAP may be communicated by any unused parameter, so long as that parameter is mapped to the same functionality on each participating station. Hence, a look-up table may provide the translation of the SAP into the lengthy, higher level UPnP or Bonjour string associated with the given service or application.

An alternative to the recycling of unused or invented parameters, is to define an SAP by a unique hexadecimal string as illustrated in the second example of FIG. 3. This could be accomplished, for example, by using a cryptographic hashing function to hash the service or application name along with any additional required interoperability data.

Figure 4:
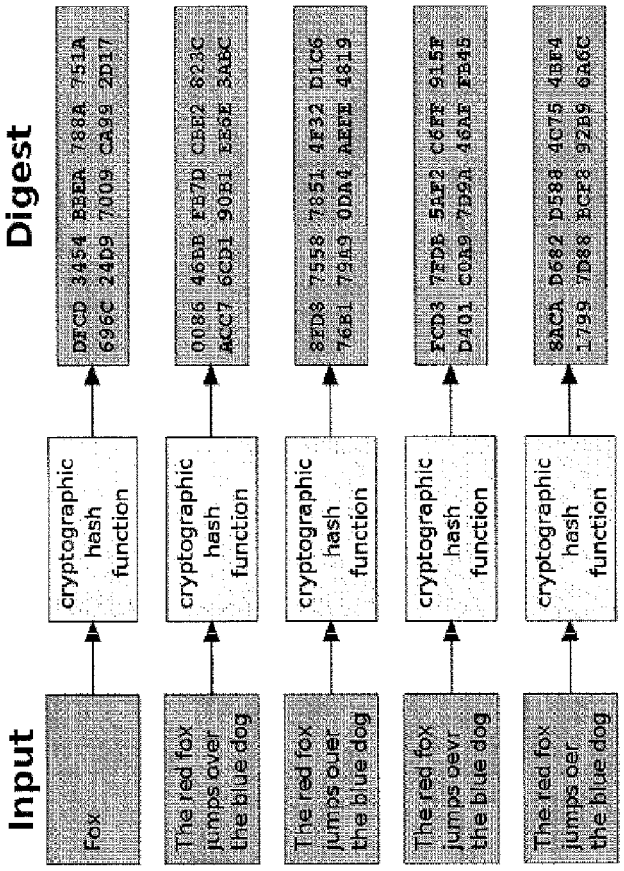
FIG. 4 illustrates and describes properties of cryptographic hash functions.

FIG. 4 demonstrates some general features of a cryptographic hashing function. Using a hashing function to identify a SAP or Service ID may have a variety of benefits associated with it. For example, a requesting station looking to support a given application or service could hash the service name and interoperability data in some prescribed way, and dispatch the hashed string as its service query pre-association string. Since identically hashed data generates identical hashed strings, and the likelihood of two different pre-hashed values resulting in the same hashed string is essentially zero, the hashed string acts like a powerful compatibility key. A station receiving the hashed string query could consult a look-up table, check its own internally stored hash codes, or even dynamically hash its own service or application data to check for a comparison.

A second benefit of hashing the data is compression. In general, the input length of a cryptographic hashing function may be unlimited, and will still result in a unique, fixed length output with very high probability. Accordingly, the range of information specificity for a given service or application may be essentially unlimited, ranging from extremely broad (e.g., running Social Networking Application X) to extremely narrow (e.g., Y is on the "Dirty Dozen" bowling team out of Oxnard, Calif.) depending on how the input is constructed prior to the hash. As long as separate stations follow a same set of pre-hashing rules, the stations are guaranteed to create the same fixed-length outputs.

Yet another benefit associated with hashing service or application information may be security. Since one property of a hashed string is that a hashed string may not be "unhashed" to determine the originating data (i.e., the Service ID or SAP), stations that wish to run services or applications in private while seeking peers running or offering the same service or application may do so without fear of the application or service being de-coded by third parties.

Figure 5A:
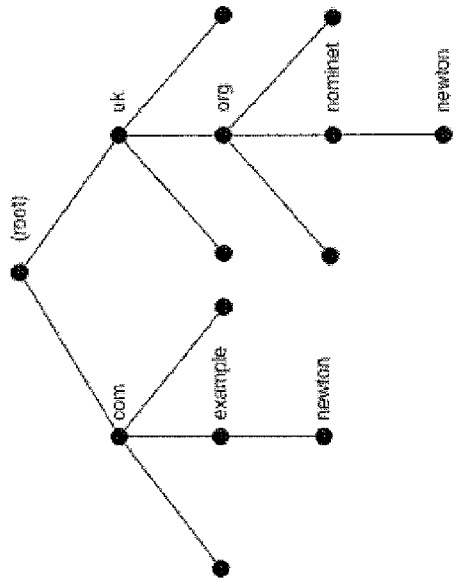
FIGS. 5A and 5B illustrate examples of centralized and de-centralized service or application identification schemes.
Figure 5B:
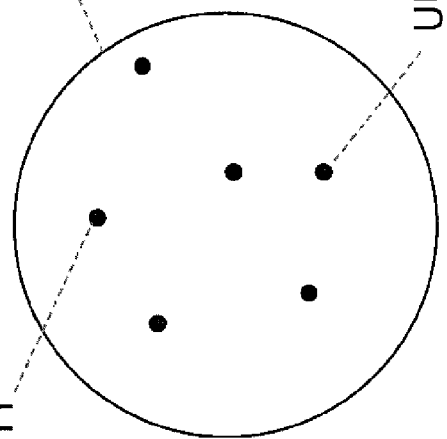

A further requirement in identifying and distinguishing services or applications across a network is assuring that each is associated with a unique service identification string. FIGS. 5A and 5B depict two methods for creating universally unique identification strings (UUID's). As shown in FIG. 5A, UUID's are generally made unique by creating hierarchies that are controlled by a central authority with sub-branches delegated within a limited name space (e.g. DNS names and IANA). This is a simple method that is commonly used to give unique names/paths to entities on a network, files on a computer, internet addresses and the like. Examples of hierarchical names include "C:\Program Files\ . . . \Example.jpg," "www.uspto.gov/patents/index.jsp," and (in regard to a hypothetical print service) "\\USPTO\Printers\ . . . \IP_172.16.1.145," where "\\" denotes "return to root," and "IP_172.16.1.145" represents the port.

FIG. 5B shows a more flexible method, in which very large numbers are assigned as the UUID's. In this model, each identifier is guaranteed to a very high probability to be unique. For example, a UUID consisting of 16 octets of binary bits gives a total of $2^{128}=10^{38,532}$ possible combinations. For comparison, there are $6.8 \times 10^9$ people on earth, $3 \times 10^{23}$ stars in the observable universe, and $10^{28}$ atoms in the human body. Accordingly, the likelihood of a "hash collision" is insignificant, even if the number of stations on a given network equals the number of atoms in a human body (in that case, $100*(10^{28}/10^{38,5321})$ or about 1 in 3 billion)! Interestingly, despite the enormous address space, 128 binary bits is equivalent to 32 hexadecimal bits, which is far smaller than most hierarchical addresses. For example, the string "\\USPTO\Printers\Room_128\IP172.16.1.145" already contains 41 ACSII characters. Of course, there is also no reason for 128 binary bits to set the limiting string length, and larger or smaller values may be used solely or in conjunction with other strings to ultimately specify a SAP or UUID.

One way of achieving UUID's in this large address space is to simply apply a cryptographic hash function in the same fashion as described above in creating unique SAP's. This is another benefit of using hashed strings to perform SAP identification; it may often be the case, depending on the hashed string address space, that a service or application SAP is also sufficient to serve as its UUID. Of course, the same advantages of security and compression of hashed strings described above applies equally to a UUID as to the SAP.

A final addition to the pre-association architecture may be the addition of supplementary information that may be useful in making a determination on whether to request/accept a given connection. Supplementary information may include:

Discovering a specific person
  The person would be running a specific application/service on a mobile device
Discovering any person that is a member of a specific group
  These could be users running a specific application or service, and may further include users in a particular group within the application (i.e., social media peers or team members in a game)
Supporting privacy for service discovery In the case of supplementary information, a publicly defined Service Id (SAP) may be used as a bootstrap point for a given service or application. In this case, additional Local Service Identifiers may be added (hierarchically or de-centralized) that may correspond to more specific service information or service modifiers, indicating additional parameters such as (i) specific context of service, (ii) a specific user, (iii) a user group, or (iv) a private/secure instance of the service, to name a few possibilities.

Yet another extension of the pre-association construct may be to provide information to stations with little to no possibility for connection. This makes sense as more and more "dumb" devices become wirelessly available. For example, the reading of a local thermometer, or the remote status of the front door light may be of interest, though establishing a connection to either may not be.

Figure 6:
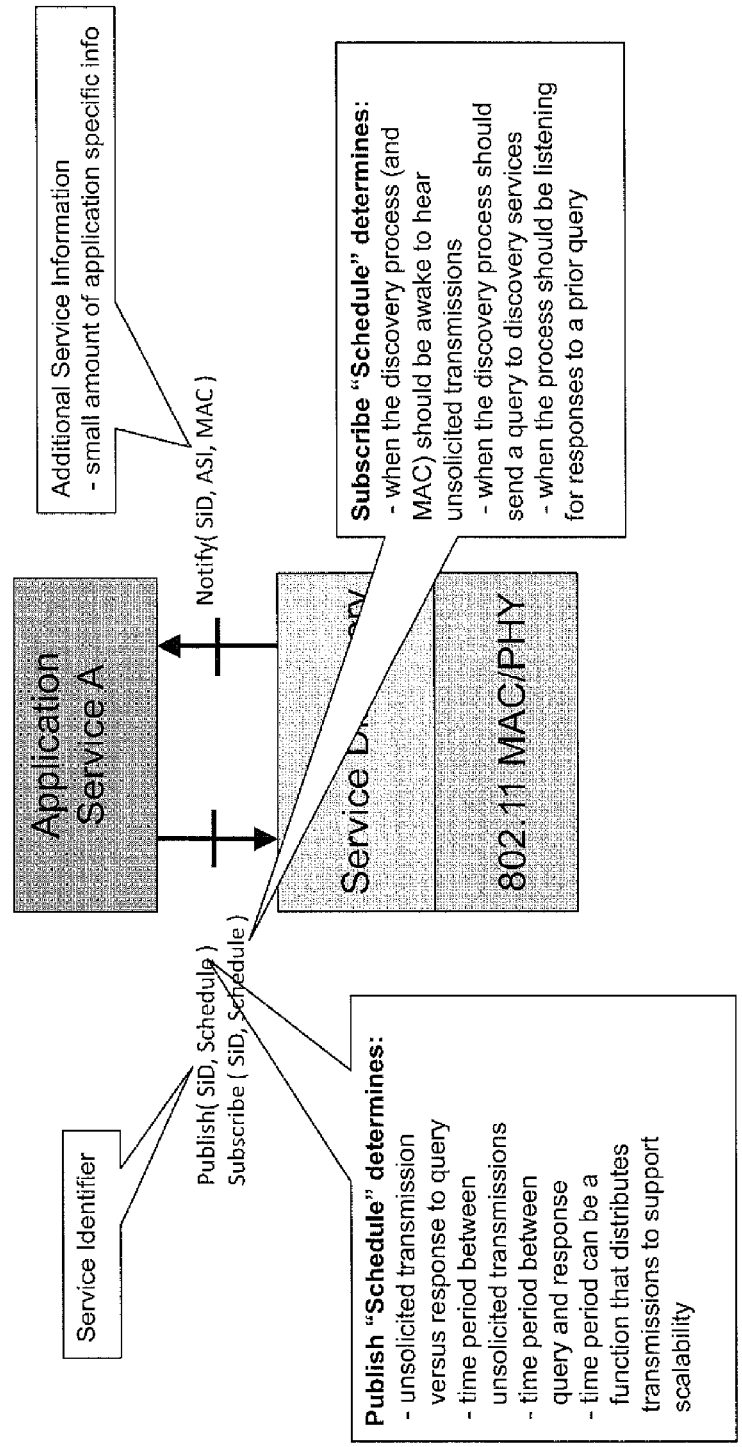
FIG. 6 illustrates an exemplary service/application discovery interface.

FIG. 6 illustrates an exemplary publish/subscribe framework supported using pre-association. This could be an example of a robust framework established using only the pre-association framework. In FIG. 6, each "publish" message, sent by Service A, consists of a Service ID (SAP) and a "publish" schedule (as supplementary information) indicating when Service A will send unsolicited transmissions. Each "subscribe" message, sent by Service A, consists of a Service ID (SAP) and a "subscribe" schedule, indicating when the discovery process (and MAC of the subscribing station) should be awake to hear unsolicited transmissions. Each "notify" message, sent from the station to Service A, consists of a Service ID (SAP), a MAC identifying message, and additional service information from the station to Service A.

Figure 7:
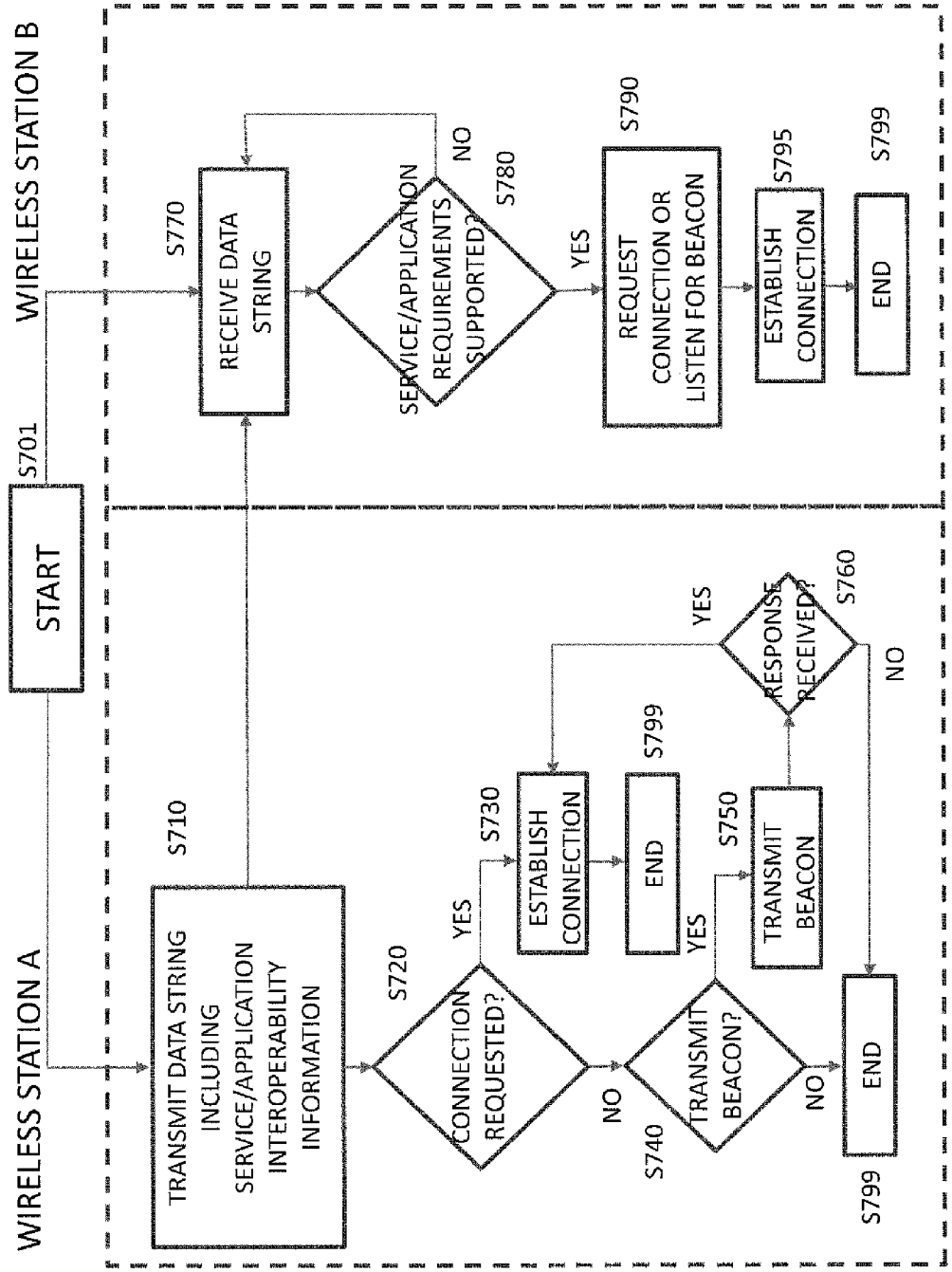
FIG. 7 illustrates an exemplary flow chart of the service/application discovery process between two wireless stations.

FIG. 7 is a flowchart outlining an exemplary service discovery process 700. In FIG. 7, wireless station A supports a given service or application which wireless station B may be in search of. The process begins at step S701 and proceeds to step S710, where wireless station A transmits a data string identifying all necessary interoperability information for a particular service or application to wireless station B. In step S720, wireless station A checks to see if a connection has been requested by wireless station B. If a connection has been requested, wireless station A proceeds to step S730, where a connection is established between wireless station A and wireless station B. Control then passes to step S799, where the method ends. If a connection has not been requested, or if the network configuration is such that wireless station B is configured to wait for a beacon to respond to, wireless station A may proceed to step S740 where wireless station A checks if it is time to (or configured to) transmit a beacon. If it is time to/configured to transmit a beacon, control passes to step S750 where a beacon is transmitted by wireless station A. Wireless station A then proceeds to step S760, where it is determined if a response to the beacon has been received. If a response has been received, wireless station A returns to step S730 where a connection between wireless station A and wireless station 13 is established, and then proceeds to step S799 where the process ends. If it was not time to send a beacon, if wireless station A was not configured to send a beacon, or if a response to the beacon sent in step S760 was not received, the flow also passes to step S799 where the method ends.

From the perspective of wireless station B, the data string is received by wireless station B in step S770, and in step S780 it is determined whether the interoperability requirements are met by wireless station B. If the interoperability requirements are not met, wireless station B resumes receiving data strings in step S770. If the interoperability requirements are met, wireless station B proceeds to step S790, where wireless station B may either solicit a connection with wireless station A or wait until wireless station A generates a beacon to respond to. In either case, wireless station B then establishes a connection with wireless station A in step S795, and then proceeds to step S799 where the method ends.

By extending the above ideas, a network according to embodiments of the disclosure can be constructed in which pre-association between multiple different stations allows for the efficient selection of meaningful connections. In accordance with the features described above, an exemplary embodiment of the disclosure proposes to perform service discovery based on the following model:

(1) Define Service Discovery frames as new IEEE 802.11 Management frame(s) of subtype Public Action.

(2) Public Action frames carry opaque "Service Id" octet string(s) that are created as a hash of some application specific information that uniquely identifies a service.

(3) For a Service Id, there may be an optional Service Capability field to provide service specific additional constraints (4) Service Discovery is performed by:
  (a) A Service Discovery request/response sequence (request may be unicast or broadcast for a Service Id)
  (b) A Service Announcement (e.g., an unsolicited broadcast/multicast of a Service Id)

(5) 46 bits of the Service Id can be used to create a multicast address for requests or announcements.

(6) Service Discovery frames may be constructed to allow request or indication of more than one service, however limitations on the fields should constrain the size of the Service Id fields, Service Capability fields and total size of the Discovery Frames.

The instructions for performing the wireless discovery process can be provided in electronics (e.g., as an Application Specific Integrated Circuit (ASIC) or as software instructions stored on a recording medium such as RAM, ROM, a removable memory (e.g., a removable memory chip or disc) or a fixed memory such as a hard drive.

Figure 8:
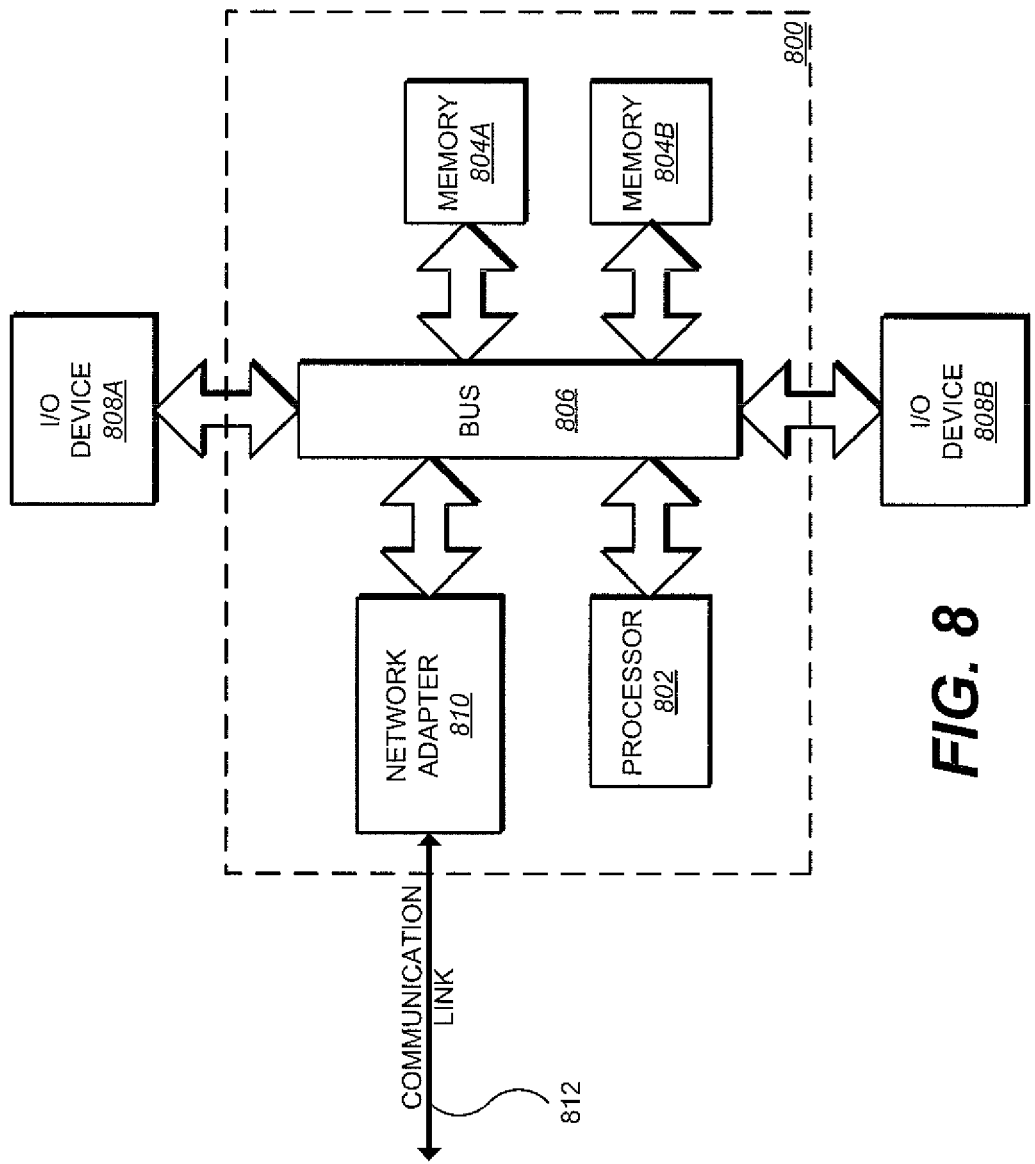
FIG. 8 is an exemplary block diagram of a device suitable for storing and/or executing program code in accordance with one implementation of the invention.

FIG. 8 illustrates one embodiment of a device 800 suitable for storing and/or executing program code to perform one or more processes described above. The wireless device 800 can be a wireless access point and/or a wireless station in various embodiments. The device 800 includes a processor 802 coupled to memory elements 804A-B through a system bus 806. In other implementations, the device 800 may include more than one processor and each processor may be coupled directly or indirectly to one or more memory elements through a system bus. The memory elements 804A-B can include local memory employed during actual execution of the program code, bulk storage, and cache memories that provide temporary storage of at least some program code in order to reduce the number of times the code must be retrieved from bulk storage during execution. As shown, input/output or I/O devices 808A-B (including, but not limited to, keyboards, displays, pointing devices, etc.) are coupled to the device 800. I/O devices 808A-B may be coupled to the device 800 directly or indirectly through intervening I/O controllers (not shown).

In one implementation, a network adapter 810 is coupled to the device 800 to enable the device 800 to become coupled to other data processing systems or remote printers or storage devices through a communication link 812. The communication link 812 can be a private or public network, wireless or wired. Wireless modems, cable modems, and Ethernet cards are just a few of the currently available types of network adapters.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for performing wireless discovery between two or more wireless stations, the method comprising:
  prior to a connection having been established between a first wireless station and a second wireless station, transmitting a data string from the first wireless station to the second wireless station,
  wherein the data string includes interoperability information necessary for a service or an application to run on the second wireless station, the interoperability information indicating mutual compatibility between the first wireless station and the second wireless station regarding the service or the application, and the data string further includes supplementary information about the service or application not essential to identifying and running the service or application by the second wireless station receiving the data string; and
  establishing a wireless connection between the first wireless station and the second wireless station if the second wireless station receiving the data string contains the necessary interoperability hardware and/or software to run the service or application described by the data string.

2. The method of claim 1, further comprising:
  establishing a wireless connection between the first wireless station and the second wireless station if the second wireless station receiving the data string contains the necessary interoperability hardware and/or software to run the service or application described by the data string.

3. The method of claim 1, wherein the data string further includes a unique identification for the service or application.

4. The method of claim 3, wherein the data string is an output of a hashed function based on the service or application identification data.

5. The method of claim 3, wherein the data string is an unused parameter or an invented parameter of a layer 3 or lower protocol of the Open System Interconnection (OSI) 7-layer model.

6. The method of claim 1, wherein the supplementary information contains data specifying one or more groups that the first wireless station belongs to.

7. The method of claim 1, wherein the second wireless station instantiates the application in application layer of the Open System Interconnection (OSI) 7-layer model based on the interoperability information prior to establish a connection with the first wireless station.

8. A first wireless station comprising:
electronics and/or software configured to generate a data string including interoperability information necessary for a service or an application stored on the first wireless station to run on a second wireless station, the interoperability information indicating mutual compatibility between the first wireless station and the second wireless station regarding the service or the application, wherein the data string further includes supplemental information about the service or application not essential to identifying and running the service or application by the second wireless station receiving the data string; and
a wireless transceiver configured to, prior to a connection having been established between the first wireless station and the second wireless station, transmit the data string to the second wireless station, wherein a wireless connection between the first wireless station and the second wireless station is only established if the second wireless station contains the necessary interoperability hardware and/or software to run the service or application described by the data string.

9. The first wireless station of claim 8, wherein a wireless connection between the first wireless station and the second wireless station is only established if the second wireless station contains the necessary interoperability hardware and/or software to run the service or application described by the data string.

10. The first wireless station of claim 8, wherein the data string further includes a unique identification for the service or application.

11. The first wireless station of claim 10, wherein the data string is an output of a hashed function based on the service or application identification data.

12. The first wireless station of claim 10, wherein the data string is an unused or invented parameter of a layer 3 or lower protocol of the Open System Interconnection (OSI) 7-layer model.

13. The first wireless station of claim 8, wherein the supplementary information contains data specifying one or more groups to which the first wireless station belongs.

14. A non-transitory computer readable storage medium storing instructions for causing one or more processors to perform the following step:

transmitting a data string from a first wireless station to a second wireless station, prior to a connection having been established between the first wireless station and the second wireless station, wherein the data string includes interoperability information necessary for a service or an application to run on the second wireless station, the interoperability information indicating mutual compatibility between the first wireless station and the second wireless station regarding the service or the application, the data string further includes supplementary information about the service or application not essential to identifying and running the service application by the second wireless station receiving the data string; and
establishing a wireless connection between the first wireless station and the second wireless station if the second wireless station receiving the data string contains the necessary interoperability hardware and/or software to run the service or application described by the data string.

15. The non-transitory computer readable storage medium of claim 14, the steps further including:
establishing a wireless connection between the first wireless station and the second wireless station if the second wireless station receiving the data string contains the necessary interoperability hardware and/or software to run the service or application described by the data string.

16. The non-transitory computer readable storage medium of claim 14, wherein the data string further includes a unique identification for the service or application.

17. The non-transitory computer readable storage medium of claim 16, wherein the data string is an output of a hashed function based on the service or application identification data.

18. The non-transitory computer readable storage medium of claim 16, wherein the data string is an unused parameter or an invented parameter of a layer 3 or lower protocol of the Open System Interconnection (OSI) 7-layer model.

19. The non-transitory computer readable storage medium of claim 14, wherein the supplementary information contains data specifying one or more groups to which the first wireless station belongs.

* * * * *